Patented Apr. 24, 1928.

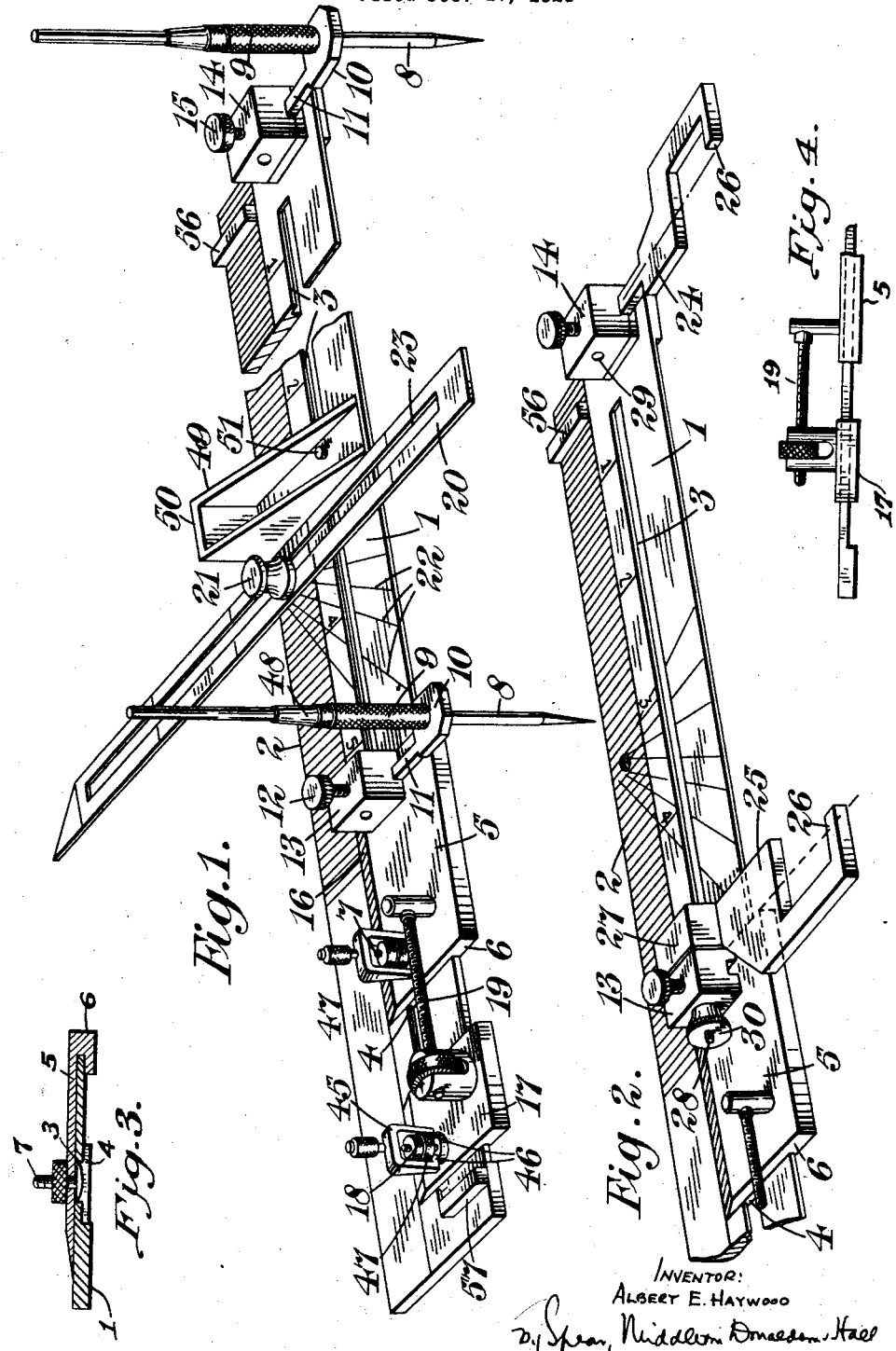

1,666,934

UNITED STATES PATENT OFFICE.

ALBERT EDWARD HAYWOOD, OF COVENTRY, ENGLAND.

INSTRUMENT FOR DRAWING, MARKING OUT, AND MEASURING OR LIKE PURPOSES.

Application filed December 17, 1925, Serial No. 75,972, and in Great Britain December 17, 1924.

This invention relates to instruments for drawing, marking out, and measuring or like purposes, and its principal object is to provide a simple and relatively inexpensive appliance which is suitable for use in the workshop, drawing office, technical class, elementary school, or the like, and is adapted to perform numerous operations, each of which would ordinarily require a different instrument.

According to this invention, an instrument for drawing, marking out and measuring, or like purposes comprises a beam compass or adjustable trammel constituted by a graduated rule, a travelling slide thereon, and a plurality of interchangeable fittings engageable with the rule and with the slide adapted for scribing, internal and external measurements or the like, and adapted at their acting parts some to extend in the plane of the rule and others transversely thereto and automatically to register respectively with the zero end thereof and with the index line of the travelling slide.

The interchangeable fittings may include calliper arms or jaws for both inside and outside measurements, with vernier and with or without micrometer adjustments for the slide of the trammel.

In the accompanying drawings, which illustrate a preferred method of carrying out the invention, Figure 1 is a perspective view showing the instrument arranged as an adjustable trammel, but also having mounted upon it the adjustable arm and a fitment for using the latter as a depth gauge, Figure 2 is a fragmentary perspective view of the rule provided with calliper jaws.

Fig. 3 is a sectional view of the slide showing the manner of attachment of the sliding block.

Fig. 4 is a side elevation of a micrometer adjustment for the movable slide.

In carrying out the invention, a flat rule 1 with a graduated edge 2 is provided with a continuous lengthwise slot 3 extending nearly to its ends. Preferably the sides of the slot are bevelled or undercut, and between them fits a sliding block 4 of a thickness slightly less than that of the rule. A slide 5 having an engagement at 6 with one edge of the rule to be guided thereby is adapted to be clamped in any position along the rule by means of a bolt 7 having a milled-edge nut. This bolt extends from the block 4, which, when the bolt is tightened, is drawn securely against the undercut sides of the slot 3, thus holding the slide 5 securely.

The slide 5 carries any usual trammel attachment, such as the pointed rod 8, by means of a suitable support or hollow pillar 9 perpendicular to the face of the rule, and the pillar may be hinged at its base to lie flat on the slide when not required, or, as shown, it may be carried by a plate 10 having a stem 11 adapted to be clamped by means of the screw 12 in the block 13 secured on the slide.

At the end of the rule (which may or may not be the zero of its scale) is fixed a block 14 similar to the block 13, and into this can be clamped, by the screw 15, the stem 11 of another plate 10 carrying a pillar 9 and pointed rod 8.

The location of the pillar 9 on the relatively fixed plate 10 is such that the point of the rod is brought exactly to the zero of the scale, whilst the point of the rod on the slide 5 registers with one end of a bevelled edge 16 of the slide extending over the graduations of the rule so that a desired radius of dimensions can immediately be obtained.

The foregoing parts constitute the beam compass or adjustable trammel, and a vernier scale can be provided at the edge 16, as shown. Also a micrometer adjustment can be combined in any usual manner with the movable slide to permit a higher degree of accuracy, and is constituted in the known manner by the auxiliary slide 17 with a clamping device 18 and micrometer screw 19 connecting it with the slide 5.

Combined with the main rule 1 is an auxiliary rule or straight edge 20 forming the adjustable arm previously mentioned, which is clamped to the rule by a screw 21 located at or near the latter's mid length, and so arranged that the straight edge can move lengthwise or be swung angularly about the clamping screw. Inclined graduations 22 are provided at various angles transversely of the edge of the rule 1, so that this straight edge can be adjusted to any desired angle forming thereby either a square, or a protractor, or an adjustable bevel. Furthermore the straight edge, which is preferably narrow, can be used as a depth gauge, and for this purpose its edge may, if preferred, be graduated. The straight edge may be provided with a long slot 23 through which the clamping screw 21 extends, or other known means may be adopted to allow of its endwise movement. When not in use this straight edge is adapted to lie lengthwise along the rule clear of the slot 3, and clear also of the slide 5 which carries the movable trammel point or other fitment.

The holes provided in the blocks 13 and 14 to receive the stems 11 of the trammel parts are also adapted to carry calliper jaws such as 24 and 25, Figure 2. These are so arranged that their acting faces 26 register respectively with the zeros of the rule 1 and the vernier scale on the slide 5. These jaws are interchangeable to provide outside and inside callipers, and in each position zero registration is obtained. Instead of the stem 11, the jaws may be provided with blocks 27 carrying bolts 28 adapted to extend through holes 29 in the blocks 13 and 14 parallel to the edge of the rule. There is then less risk of rocking of the jaws, as they can be drawn tightly against the blocks by means of nuts 30. Also if preferred a lockable nut on the bolt 28 could be sunk partially in a recess in the block 13 or 14, and would serve as an adjustment device to compensate wear of the acting faces of the jaws. This lock nut is not shown, but is a well known expedient.

A locking device is illustrated only in Figure 1 and comprises a fork 45 adapted to admit the bolt and having inturned pins 46 which engage a collar or a nut 47 on the head of the bolt and are of cam shape, so that when the fork is turned down against the scale or other part, they exert an axial thrust on the collar acting to tighten the bolt, and when the fork is erect, as shown, they free the collar and thus slacken the bolt. This fork is adapted to lie in a long recess in the limb beneath the slide and is only hinged up therefrom about its cam faces when it is desired to slacken the bolt.

An important feature is that the scriber can be slidably mounted either in the rule or in the slotted straight edge, preferably by providing it with a hollow pillar, such as 9 (Figure 1), and, being endwise adjustable and clampable therein by a known arrangement as at 48 (Figure 1), is adapted to operate with equal accuracy either on a flat or a recessed surface. The tool as thus arranged can also be used for drawing lines tangentially to a circular piece of work and for marking out the sides of polygonal figures by suitably adjusting the angle of the straight edge, and by sliding the pillar carrying the scriber along the straight edge or the rule 1 by the means there shown.

A further device relates to the use of the instrument as a depth gauge. Considerable inaccuracy arises if the depthing device is not kept perpendicular (i. e. parallel with the axis of the hole), and therefore to prevent rocking of the straight edge which carries the depthing device, a loose block 49 (Figure 1), preferably in the form of a right angled triangle, is adapted to engage the face of the rule, providing thereby a base 50 at the edge of the rule and giving the latter a greater degree of support and ensuring the requisite accuracy of location. Preferably this block has a projection on the face (not visible in the drawing) which extends into the slot 3 in the rule and a turnbutton mounted on the projecting part and pivoted at 51 passes completely through the slot, and when turned transversely to it, locks the block securely, preferably by a suitable cam action of the face of the turnbutton.

With reference to the calliper jaws 24 and 25, an additional jaw may be provided which is bent into a plane at right angles to those shown, so that it may co-operate with the scriber or corresponding point of the trammel.

If preferred, the longitudinal slot 3 in the rule may be so modified that the clamping action for the slide 5 may take place between one edge of the rule and one edge of the slot so that the accuracy of the vernier readings will be ensured by the slide always co-operating with the edge of the rule.

When using the tool as a height gauge, and to enable it to be guided along the edge of the work, pins 59 may be provided at the extremities of one or both of the limbs of the base on its underside to engage the work or the edge of a marking-off table or equivalent part. These pins can be slidably mounted in the base so that they can be pushed in flush when not required.

From the foregoing it will be seen that a very simple and compact form of instrument is provided which can be either constructed with a moderate degree of accuracy for use in elementary schools, or can have a high degree of accuracy imparted to it so that it may be used in drawing offices or on the marking out tables of fitting and erecting workshops. As will be seen, it is of simple construction, compact in form and adapted to perform a great number of operations for which separate tools are usually required.

The modifications and auxiliary parts described adapt it to deal with work having recesses, projections or irregular faces. Furthermore, an important feature is that by its use no compensations or allowances are necessary in the scale readings, whether the instrument is used for inside, outside or other work.

I am aware that a combination tool has previously been proposed in the form of a beam compass comprising a longitudinally slotted graduated rule, a point pivoted at one end of the rule and adapted to be clamped as desired, and a vertical member having a transverse slot through which the rule slidably extended, adapted to act as a centre punch or as one leg of a pair of compasses. This slotted rule also carried transverse to itself a skeleton member adjustable longitudinally, transversely, or in conjunction with a protractor, angularly of the rule, and it was provided at one end with a longitudinal fixed spike and with an endwise adjustable transverse spike, a detachable longitudinal leg being provided at the other end.

What I claim as my invention and desire to secure by Letters Patent of the United States is:—

1. An instrument assembly of the type described, comprising a graduated rule having a longitudinal slot therein, one side of the rule defining said slot being undercut, a slide carrying a block sliding in said slot, a portion of said slide extending under the undercut side of the rule, and means penetrating said slide and said block whereby the slide may be fixed in relation to the rule, said slide carrying means to fix other instruments to said assembly.

2. An instrument assembly of the type described comprising a graduated rule having a central longitudinal slot therein, a travelling slide thereon engaging one longitudinal edge of the rule and the central longitudinal slot, an auxiliary slide likewise engaging said rule, and micrometer screw adjustment means connecting said auxiliary slide to said travelling slide.

In testimony whereof I have signed my name to this specification.

ALBERT EDWARD HAYWOOD.